(12) United States Patent
Yamamoto et al.

(10) Patent No.: US 10,201,859 B2
(45) Date of Patent: Feb. 12, 2019

(54) CHUCK STRUCTURE

(71) Applicant: NTN CORPORATION, Osaka (JP)

(72) Inventors: Masayuki Yamamoto, Shizuoka (JP); Tsuyoshi Yagi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/512,628

(22) PCT Filed: Sep. 8, 2015

(86) PCT No.: PCT/JP2015/075378
§ 371 (c)(1),
(2) Date: Mar. 20, 2017

(87) PCT Pub. No.: WO2016/052085
PCT Pub. Date: Apr. 7, 2016

(65) Prior Publication Data
US 2017/0291225 A1    Oct. 12, 2017

(30) Foreign Application Priority Data

Sep. 29, 2014    (JP) .................... 2014-198865

(51) Int. Cl.
*B23B 31/117*    (2006.01)
*B23B 31/40*    (2006.01)
(Continued)

(52) U.S. Cl.
CPC ........ *B23B 31/1173* (2013.01); *B23B 31/117* (2013.01); *B23B 31/404* (2013.01);
(Continued)

(58) Field of Classification Search
CPC ........... B23B 31/1173; Y10T 279/1045; Y10T 279/1054; Y10T 279/17461; Y10T 279/17521; B24B 41/061; B24B 41/067
See application file for complete search history.

(56) References Cited

U.S. PATENT DOCUMENTS

| 855,280 | A | * | 5/1907 | Campbell | ............ B23B 31/201 |
| | | | | | 279/50 |
| 1,060,845 | A | * | 5/1913 | Johnson | ................ B23B 31/202 |
| | | | | | 279/51 |

(Continued)

FOREIGN PATENT DOCUMENTS

| JP | 08-019908 | 1/1996 |
| JP | 9-201732 | 8/1997 |

(Continued)

OTHER PUBLICATIONS

International Preliminary Report on Patentability and Written Opinion of the International Searching Authority dated Apr. 4, 2017 in corresponding International (PCT) Application No. PCT/JP2015/075378.

(Continued)

*Primary Examiner* — Eric A Gates
(74) *Attorney, Agent, or Firm* — Wenderoth, Lind & Ponack, L.L.P.

(57) ABSTRACT

Provided is a chuck structure, which is configured to chuck an annular workpiece from a radially outer side of the workpiece. The chuck structure includes: leaf spring members arranged at a predetermined pitch along a circumferential direction of the chuck structure so as to be symmetrical with respect to a mechanism center axis; chuck claw members mounted to distal ends of the leaf spring members, respectively; and a pressing force applying mechanism configured to apply a force of pressing the leaf spring members radially inward, to thereby elastically press the chuck claw members onto a radially outer surface of the workpiece.

7 Claims, 5 Drawing Sheets

(51) Int. Cl.
   *B24B 41/06* (2012.01)
   *B23B 31/08* (2006.01)
   *B23B 31/12* (2006.01)
   *B23B 31/42* (2006.01)

(52) U.S. Cl.
   CPC .......... *B24B 41/061* (2013.01); *B24B 41/067* (2013.01); *B23B 31/08* (2013.01); *B23B 31/1253* (2013.01); *B23B 31/4006* (2013.01); *B23B 31/42* (2013.01); *B23B 2260/136* (2013.01); *Y10T 279/1045* (2015.01); *Y10T 279/1054* (2015.01); *Y10T 279/17461* (2015.01); *Y10T 279/17521* (2015.01)

(56) References Cited

U.S. PATENT DOCUMENTS

| | | | | |
|---|---|---|---|---|
| 1,075,753 A * | 10/1913 | Bastian et al. | ........ | B23B 51/101 279/2.14 |
| 1,202,432 A * | 10/1916 | Rozelle et al. | .......... | H01K 3/32 279/50 |
| 1,232,735 A * | 7/1917 | Torvik | .................... | B25B 13/28 279/50 |
| 1,279,349 A * | 9/1918 | Johnson | .................. | B25B 13/44 279/46.7 |
| 1,340,841 A * | 5/1920 | Scott | ........................ | B23B 31/18 279/2.14 |
| 1,429,556 A * | 9/1922 | Bartholdy | ................ | G01B 5/08 279/2.12 |
| 1,535,543 A * | 4/1925 | Race | ........................ | B25G 1/00 279/42 |
| 2,138,012 A * | 11/1938 | Perr | ......................... | A46B 7/04 15/145 |
| 2,746,758 A * | 5/1956 | Haviland | .............. | B23B 31/202 279/133 |
| 2,935,329 A * | 5/1960 | Hessler | ................. | B23B 31/207 279/151 |
| 2,982,557 A * | 5/1961 | Anschutz | .............. | B23B 31/204 279/122 |
| 4,215,871 A * | 8/1980 | Hirsch | ................. | B23B 31/1253 279/46.3 |
| 4,513,980 A * | 4/1985 | Kruse | ................... | B23B 31/202 279/121 |
| 4,768,269 A * | 9/1988 | Williams | ................ | B23B 31/00 279/46.7 |
| 5,478,093 A * | 12/1995 | Eibl | ....................... | A61B 17/00 279/50 |
| 5,810,366 A * | 9/1998 | Montjoy | ............... | B23B 31/202 279/158 |
| 5,951,025 A | 9/1999 | Bohler | | |
| 6,612,791 B1 * | 9/2003 | Haimer | ................. | B23B 29/046 279/2.03 |
| 6,742,786 B2 * | 6/2004 | Casel | ................ | B23B 31/16166 279/123 |
| 8,425,521 B2 * | 4/2013 | Cremer | ................ | A61B 17/162 279/50 |

FOREIGN PATENT DOCUMENTS

| | | |
|---|---|---|
| JP | 2002-292590 | 10/2002 |
| JP | 2003-71669 | 3/2003 |
| JP | 2008-180534 | 8/2008 |

OTHER PUBLICATIONS

International Search Report dated Oct. 13, 2015 in International (PCT) Application No. PCT/JP2015/075378.

* cited by examiner

CHUCK STRUCTURE

TECHNICAL FIELD

The present invention relates to a chuck structure, which is configured to chuck an annular workpiece from a radially outer side of the workpiece in a machine tool such as a grinding machine.

BACKGROUND ART

Hitherto, as a chuck structure of this type, there has been known an outer diameter collet chuck which includes a collet having a plurality of gripping claws arranged along a circumferential direction of the collet (Patent Literature 1). That is, in the outer diameter collet chuck, an outer surface on a distal end side of each of the gripping claws is formed into a tapered surface tapered from a distal end side of each of the gripping claws to a proximal end side thereof, and a radially inner surface of a cylindrical part, which is arranged on an outer peripheral side of each of the gripping claws, is formed into a tapered surface tapered from a distal end side of the cylindrical part to a proximal end side thereof. Accordingly, the gripping claws are tightened and loosened through reciprocation in an axial direction. Thus, the gripping claws can chuck a workpiece from a radially outer side of the workpiece.

Further, hitherto, there has been known a chuck device using a pair of leaf spring members, though the chuck device is not configured to chuck an annular workpiece (Patent Literature 2). That is, the pair of leaf spring members clamps the workpiece.

CITATION LIST

Patent Literature 1: JP 08-19908 A
Patent Literature 2: JP 2002-292590 A

SUMMARY OF INVENTION

Technical Problem

In the outer diameter collet chuck disclosed in Patent Literature 1, there is a fear in that a radially outer surface of the workpiece may be chucked with an excessively large force. Accordingly, even if working is intended to be performed on the workpiece with high accuracy, e.g., working accuracy of $1/1000$ mm through use of the outer diameter collet chuck disclosed in Patent Literature 1, when the outer diameter collet chuck chucks an annular workpiece, in particular, a thin and annular workpiece, there is a fear in that the workpiece is deformed by being chucked so that the working accuracy is degraded.

Accordingly, it is necessary to chuck the thin and annular workpiece with a relatively small force. In this context, as disclosed in Patent Literature 2, there can be proposed the device configured to clamp the workpiece by the pair of leaf spring members. That is, the device has the structure of clamping the workpiece by the opposing two leaf spring members.

However, when the workpiece is chucked by the two leaf spring members, the workpiece cannot be held satisfactorily in a radial direction. Further, the device disclosed in Patent Literature 2 is configured to chuck a minute workpiece. Accordingly, it is structurally difficult to employ the device disclosed in Patent Literature 2 to chuck the workpiece on a main spindle of a machine tool configured to perform working on an annular workpiece having a large diameter.

The present invention has been made in view of the above-mentioned problems, and has an object to provide a chuck structure capable of stably chucking an annular workpiece without deforming the workpiece.

Solution to Problem

According to a first aspect of the present invention, there is provided a chuck structure, which is configured to chuck an annular workpiece from a radially outer side of the workpiece, comprising: leaf spring members arranged at a predetermined pitch along a circumferential direction of the chuck structure so as to be symmetrical with respect to a mechanism center axis; chuck claw members mounted to distal ends of the leaf spring members, respectively; and a pressing force applying mechanism configured to apply a force of pressing the leaf spring members radially inward, to thereby elastically press the chuck claw members onto a radially outer surface of the workpiece.

According to the chuck structure of the first aspect of the present invention, a chucking force of elastically pressing the chuck claw members onto the radially outer surface of the workpiece can be applied through the pressing force applying mechanism. Thus, the workpiece can be chucked from the radially outer surface side of the workpiece. In addition, the chuck claw members are arranged at a predetermined pitch along the circumferential direction so as to be symmetrical with respect to the mechanism center axis. Accordingly, even when each of the chuck claw members exerts a small pressing force on the radially outer surface of the workpiece, the chuck structure can stably chuck the workpiece.

Each of the leaf spring members is arranged in an oblique posture so that a distal end side of the each of the leaf spring members is directed radially outward. The pressing force applying mechanism comprises a pressing member to be brought into contact with a radially outer side of the each of the leaf spring members. The chuck claw members can be tightened and loosened by up-and-down movement of the pressing member. With this configuration, the chuck claw members respectively mounted to the leaf spring members can be tightened and loosened in a radial direction by up-and-down movement of the pressing member. Accordingly, a moving amount of each of the chuck claw members during a shift from a chucked state to an unchucked state or during a shift from the unchucked state to the chucked state can be stably secured.

It is preferred that the pressing member comprise a plurality of pressing members arranged to correspond to the leaf spring members, respectively, and that the plurality of pressing members be moved up and down in synchronization with each other. When the pressing members are moved up and down in synchronization with each other, the chuck claw members are tightened and loosened in the radial direction in synchronization with each other.

It is preferred that the chuck structure further comprise: a first vertically-movable shaft configured to hold the leaf spring members; a second vertically-movable shaft configured to hold the pressing member; and a vertically moving mechanism configured to vertically move the first vertically-movable shaft and the second vertically-movable shaft independently of each other. With this configuration, the leaf spring members and the pressing members can be moved up and down at the same time by the same amount, or the leaf spring members and the pressing members can be moved up and down separately by the same amount or different amounts.

The chuck structure may further comprise a backing plate that forms a positioning reference surface for the workpiece, wherein, under a state in which the leaf spring members chuck the workpiece, simultaneous and relative movement of the first vertically-movable shaft and the second vertically-movable shaft with respect to the backing plate enables a lower end surface of the workpiece to be pressed onto the backing plate.

The chuck structure can be used to chuck the workpiece on a rotary spindle of a machine tool, and can be used for, for example, a grinding machine, as the machine tool.

According to a second aspect of the present invention, there is provided a chuck structure, which is configured to chuck an annular workpiece from a radially inner side of the workpiece, comprising: leaf spring members arranged at a predetermined pitch along a circumferential direction of the chuck structure so as to be symmetrical with respect to a mechanism center axis; chuck claw members mounted to distal ends of the leaf spring members, respectively; and a pressing force applying mechanism configured to apply a force of pressing the leaf spring members radially outward, to thereby elastically press the chuck claw members onto a radially inner surface of the workpiece.

According to the chuck structure of the second aspect of the present invention, a chucking force of elastically pressing the chuck claw members onto the radially inner surface of the workpiece can be applied through the pressing force applying mechanism. Thus, the workpiece can be chucked from the radially inner surface side of the workpiece. In addition, the chuck claw members are arranged at a predetermined pitch along the circumferential direction so as to be symmetrical with respect to the mechanism center axis. Accordingly, even when each of the chuck claw members exerts a small pressing force on the radially inner surface of the workpiece, the chuck structure can stably chuck the workpiece.

Advantageous Effects of Invention

Even when each of the chuck claw members exerts a small pressing force on the radially outer surface of the workpiece, the chuck structure according to the first aspect of the present invention can stably chuck the workpiece. Thus, even when the workpiece is thin and annular, the chuck structure can stably chuck the workpiece without deforming the workpiece.

As each of the leaf spring members, there is used a leaf spring member arranged in an oblique posture so that a distal end side of the leaf spring member is directed radially outward. With this configuration, a moving amount of each of the chuck claw members during a shift from a chucked state to an unchucked state or during a shift from the unchucked state to the chucked state can be stably secured. In addition, a relatively large moving amount is secured as the moving amount of each of the chuck claw members. Accordingly, even when a circularity of the radially outer surface of the workpiece is somewhat poor, the workpiece can be chucked with less influence on deformation. Further, accuracy of loading is not required.

When the pressing members can be moved up and down in synchronization with each other, the chuck claw members are tightened and loosened in the radial direction in synchronization with each other, thereby being capable of chucking the workpiece with high accuracy. When the first vertically-movable shaft and the second vertically-movable shaft can be vertically moved independently of each other, the leaf spring members and the pressing members can be moved up and down at the same time by the same amount, or the leaf spring members and the pressing members can be moved up and down separately by the same amount or different amounts. Thus, a chucking force can be freely changed by freely varying a shifting amount of the leaf spring members.

When the chuck structure comprises the backing plate, the workpiece can be stably seated on the backing plate. Thus, working on the workpiece through use of a machine tool such as a grinding machine employing the above-mentioned chuck structure can be performed with high accuracy.

Even when each of the chuck claw members exerts a small pressing force on the radially inner surface of the workpiece, the chuck structure according to the second aspect of the present invention can stably chuck the workpiece. Thus, even when the workpiece is thin and annular, the chuck structure can stably chuck the workpiece without deforming the workpiece.

DESCRIPTION OF EMBODIMENT

Now, an embodiment of the present invention is described with reference to FIG. 1 to FIG. 5. A chuck structure according to the present invention is a chuck structure configured to chuck an annular workpiece W from a radially outer side of the workpiece W. The chuck structure is arranged on a first vertically-movable shaft 1 and a second vertically-movable shaft 2 that are mounted to a rotary spindle 3 of a machine tool such as a grinding machine.

Figure 1:
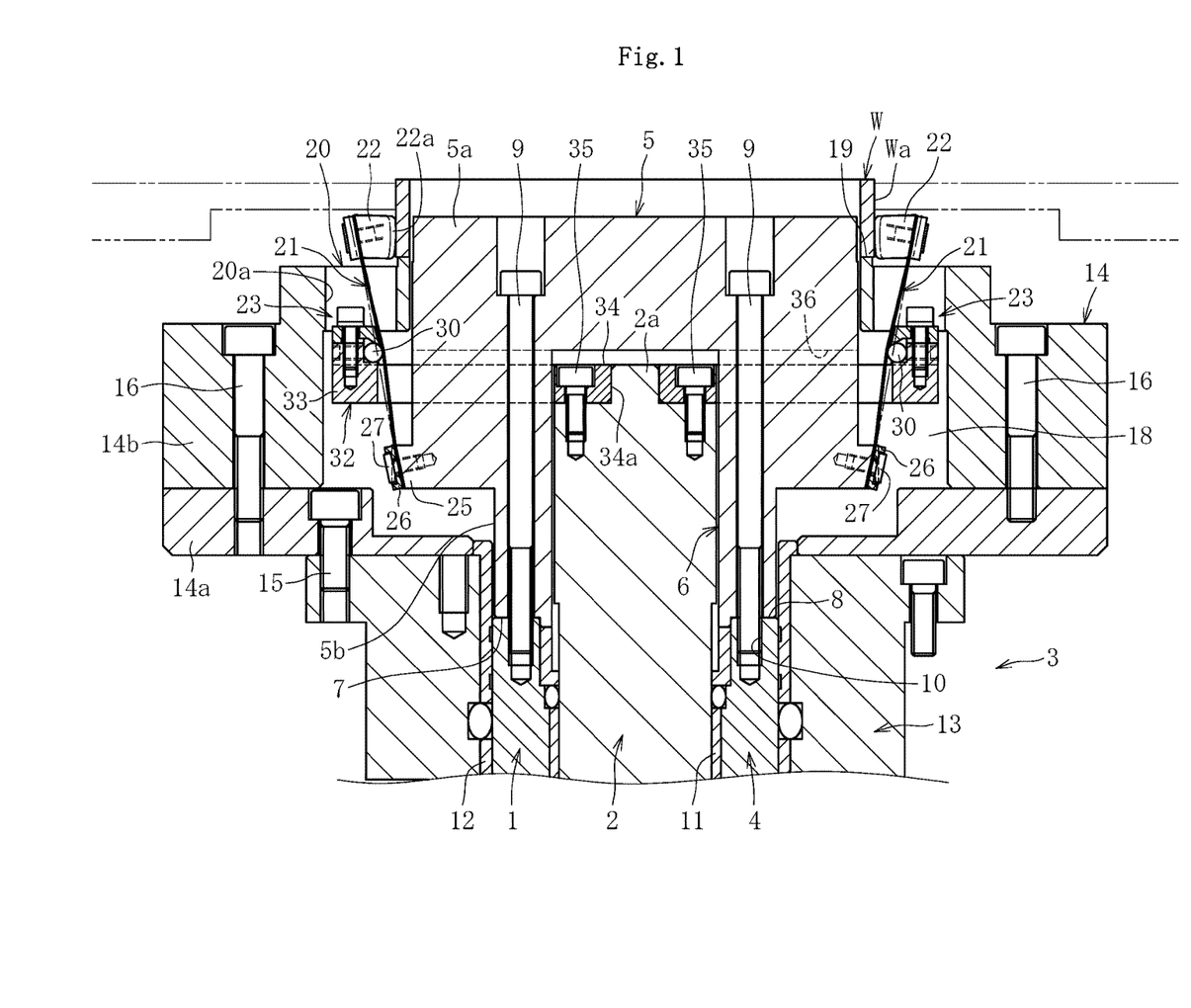
FIG. 1 is a sectional view for illustrating relevant parts of a chuck structure according to the present invention.

The first vertically-movable shaft 1 comprises a base shaft 4 formed of a tubular body, and a distal end boss section 5 formed continuously with a distal end (upper end) of the base shaft 4. The distal end boss section 5 comprises a main body portion 5a, and a tubular portion 5b extending in a suspended manner from a lower surface of the main body portion 5a. A hole, which is to be communicated to the tubular portion 5b, is formed in the lower surface of the main body portion 5a. That is, the tubular portion 5b and the hole define a fitting hole 6 into which the second vertically-movable shaft 2 is to be fitted.

In this case, a lower end surface 7 of the tubular portion 5b of the distal end boss section 5 is placed on an upper end surface 8 of the base shaft 4, and screw members 9 are inserted through the distal end boss section 5 to be respectively screwed into screw holes 10 formed in the upper end surface 8 of the base shaft 4. In this manner, the base shaft 4 and the distal end boss section are integrated with each other. Further, the second vertically-movable shaft 2 is fitted into the fitting hole 6 or an inside of the base shaft 4 formed of the tubular body.

A spacer 11 is interposed between the first vertically-movable shaft 1 and the second vertically-movable shaft 2, and the first vertically-movable shaft 1 and the second vertically-movable shaft 2 are vertically moved along an axial direction of each shaft relative to each other. That is, the first vertically-movable shaft 1 and the second vertically-movable shaft 2 are vertically moved along a direction of an axial center of each shaft independent of each other. In this case, the first vertically-movable shaft 1 and the second vertically-movable shaft 2 can be vertically moved by a key-and-keyway mechanism (not shown) relative to each other, but are restrained from rotating relative to each other.

The first vertically-movable shaft 1 is fitted into the rotary spindle 3 through intermediation of a spacer 12. In this case, the rotary spindle 3 comprises a tubular main body 13, and a receiving chamber section 14. The receiving chamber section 14 is formed continuously with an upper portion of the main body 13, and is formed of a short tubular portion having a large diameter. The receiving chamber section 14 comprises a disc portion 14a and a ring portion 14b having a large diameter. The disc portion 14a is coupled to an upper end of the tubular main body 13 with a bolt member 15. The ring portion 14b is coupled to the disc portion 14a with bolt members 16. That is, the main body portion 5a of the distal end boss section 5 of the first vertically-movable shaft 1 is received in the receiving chamber section 14 of the rotary spindle 3. In this case, a clearance 18 is defined between a radially outer surface of the main body portion 5a and a radially inner surface of the ring portion 14b of the receiving chamber section 14.

Further, a backing plate 19 is formed on the rotary spindle 3. That is, an inner flange portion 20 is formed on an upper opening of the receiving chamber section 14, and six through-holes 20a are formed in the inner flange portion 20 at positions corresponding to leaf spring members 21 to be described later, that is, at a 60-degree pitch along a circumferential direction of the rotary spindle 3. The backing plate 19 is formed of an inner peripheral edge of the inner flange portion 20.

The rotary spindle 3 and the first vertically-movable shaft 1 can be vertically moved by a key-and-keyway mechanism (not shown) relative to each other, but are restrained from rotating relative to each other. Accordingly, when the rotary spindle 3 is driven to rotate about an axial center thereof, the first vertically-movable shaft 1 and the second vertically-movable shaft 2 are rotated in synchronization with the rotary spindle 3.

The rotary spindle 3 can be driven to rotate about the axial center thereof by a rotary drive mechanism (not shown). Further, the first vertically-movable shaft 1 and the second vertically-movable shaft 2 can be vertically moved independently of each other by a vertically moving mechanism (not shown). In this case, the first vertically-movable shaft 1 and the second vertically-movable shaft 2 can be vertically moved by separate drive sources independent of each other. However, even when the chuck structure comprises the above-mentioned separate drive sources, the first vertically-movable shaft 1 and the second vertically-movable shaft 2 can be vertically moved in synchronization with each other. The rotary spindle 3 is restrained from reciprocating in an axial center direction thereof. That is, the rotary spindle 3 is allowed by a bearing mechanism (not shown) only to rotate about the axial center thereof.

The chuck structure according to the present invention comprises the leaf spring members 21 arranged at a predetermined pitch along the circumferential direction so as to be symmetrical with respect to a mechanism center axis, chuck claw members 22 mounted to distal ends of the leaf spring members 21, respectively, and a pressing force applying mechanism 23 configured to apply a force of pressing the leaf spring members 21 radially inward, to thereby elastically press the chuck claw members 22 onto a radially outer surface Wa of the workpiece W.

In this case, six leaf spring members 21 are arranged at a 60-degree pitch along the circumferential direction on the distal end boss section 5 of the second vertically-movable shaft 2. That is, a swelling portion 25 is formed on an outer peripheral portion of a lower end of the distal end boss section 5. The swelling portion 25 may be formed of a ring portion formed along the circumferential direction, or six protruding portions formed at a 60-degree pitch along the circumferential direction so as to correspond to the leaf spring members 21.

Figure 2A:
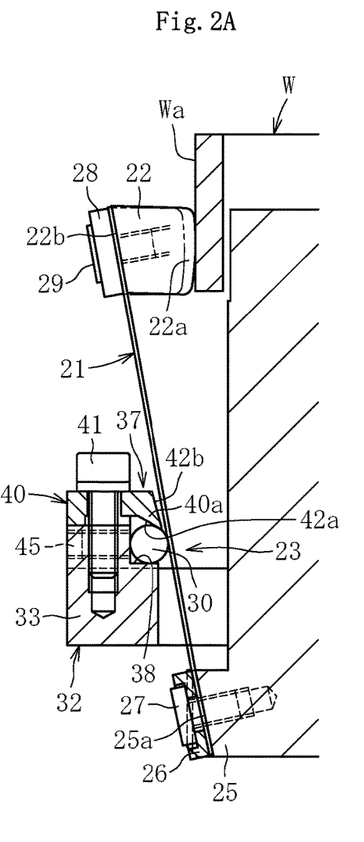
FIG. 2A is an enlarged view for illustrating a relationship between leaf spring members and a pressing force applying mechanism before a workpiece is chucked.
Figure 2B:
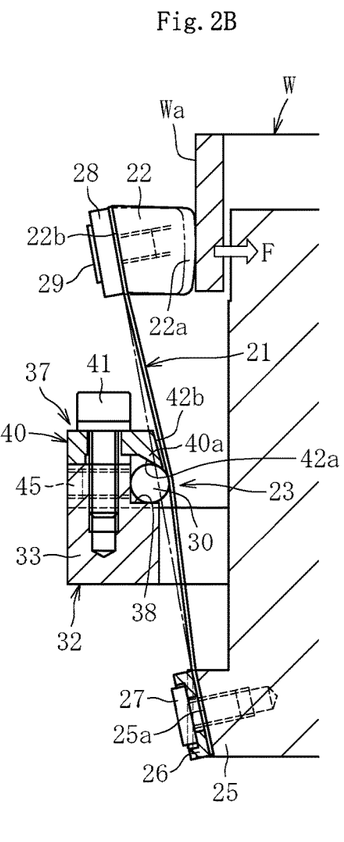
FIG. 2B is an enlarged view for illustrating a relationship between the leaf spring members and the pressing force applying mechanism under a state in which the workpiece is chucked.

As illustrated in FIG. 2A and FIG. 2B, an outer surface of the swelling portion 25 is formed of a tapered surface 25a tapered from an upper side to a lower side thereof. Accordingly, under a state in which the tapered surface 25a and a retaining piece 26 clamp a lower end of each leaf spring member 21, the retaining piece 26 is mounted to the swelling portion 25 with a bolt member 27. Accordingly, as illustrated in FIG. 2A, in a free state, each leaf spring member 21 is arranged in an oblique posture so that a distal end side of the leaf spring member 21 is directed radially outward.

A distal end of the chuck claw member 22 mounted to the distal end of each leaf spring member 21 is formed as a frictional resistance increasing portion 22a. In this case, the frictional resistance increasing portion 22a can be formed of a member comprising an uneven and rubbed surface, a member comprising a resin layer formed on a surface thereof, or a member having a large coefficient of friction. When the workpiece is chucked, the frictional resistance increasing portion 22a is held in surface contact (surface press-contact) with the radially outer surface Wa of the workpiece W. In this case, under a state in which a back tapered surface 22b of the chuck claw member 22 and a retaining piece 28 clamp an upper end of each leaf spring member 21, the retaining piece 28 is mounted to the chuck claw member 22 with a bolt member 29.

The pressing force applying mechanism 23 comprises pressing members 30 each formed of a round bar with a small length. The pressing members 30 are moved up and down (vertically moved) with respect to the first vertically-movable shaft 1. In this case, under a state in which each of the pressing members 30 is arranged so that an axis thereof is parallel to a direction orthogonal to an axis of the first vertically-movable shaft 1 and an axis of the second vertically-movable shaft 2, the pressing members 30 are held on a holding frame body 32 mounted to the second vertically-movable shaft 2. An axial length of each of the pressing members 30 is set to be substantially equal to a width dimension of each of the leaf spring members 21. Herein, the expression "substantially equal" means that the axial length of each pressing member 30 may be equal to the width dimension of each leaf spring member 21, that the axial length of each pressing member 30 may be slightly larger than the width dimension of each leaf spring member 21, and that the axial length of each pressing member 30 may be slightly smaller than the width dimension of each leaf spring member 21.

As illustrated in FIG. 1, the holding frame body 32 comprises a ring body 33, and a fixed portion 34 fixed to the upper end surface of the second vertically-movable shaft 2 with bolt members 35. A protruding portion 2a is formed on a center portion of the upper end surface of the second vertically-movable shaft 2, and a through-hole 34a is formed in the fixed portion 34. The protruding portion 2a formed on the center portion of the upper end surface of the second vertically-movable shaft 2 is fitted into the through-hole 34a of the fixed portion 34. Further, the fixed portion 34 is formed of a plate-like member, and is fitted into a slit 36 formed in the distal endboss section 5 of the first vertically-movable shaft 1.

Each of the pressing members 30 is held on the ring body 33 by a holding member 37 mounted to the ring body 33. In this case, as illustrated in FIG. 2A and FIG. 2B, cutout portions 38 are formed on a radially inner side of the ring body 33, and the pressing members 30 are fitted into the cutout portions 38, respectively. The holding member 37 comprises a block body 40 and a screw member 41. The block body 40 has an engagement piece portion 40a formed at a distal end of the block body 40. The screw member 41 is configured to mount the block body 40 to the ring body 33. The engagement piece portion 40a comprises an inner inclined surface 42a and an outer inclined surface 42b, and is gradually reduced in thickness toward a tip thereof.

That is, under a state in which the pressing members 30 are fitted into the cutout portions 38 of the ring body 33, respectively, when each block body 40 is mounted to the ring body 33 with the screw member 41, the inner inclined surface 42a of the engagement piece portion 40a of the pressing members 30 retains the holding member 37. In this manner, the pressing members 30 is supported on the ring body 33. In this case, a part of each of the pressing members 30 protrudes from a distal edge of the engagement piece portion 40a of the holding member 37 to the distal end boss section 5 side of the first vertically-movable shaft 1. An inclination of the outer inclined surface 42b of the engagement piece portion 40a of the holding member 37 is set to such an angle as to prevent the outer inclined surface 42b from coming into contact with the leaf spring member 21.

Further, adjusting members 45 are screwed into the ring body 33. The adjusting members 45 are each formed of a setscrew, and are configured to adjust protruding amounts of the pressing members 30 to the distal end boss section 5 side. That is, the adjusting members 45 are turned in a tightening or loosening direction, thereby being capable of adjusting the protruding amounts of the pressing members 30. This adjusting mechanism is arranged because intervals between the leaf spring members 21 and the pressing members 30 vary due to component accuracy and assembly accuracy.

Each pressing member 30 is held in contact with each leaf spring member 21 under the state illustrated in FIG. 2A, that is, under a state in which the leaf spring member 21 extends straight. When the ring body 33 is raised with respect to the leaf spring member 21 from this state, the pressing member 30 is raised. Then, as illustrated in FIG. 2B, the pressing member 30 presses a center portion of the leaf spring member 21 in a length direction of the leaf spring member 21 to the distal end boss section 5 side. Accordingly, under the state illustrated in FIG. 2B, the chuck claw member 22 presses the radially outer surface Wa of the workpiece W in a direction indicated by the arrow F.

Further, when the ring body 33 is lowered with respect to the leaf spring member 21 from the state illustrated in FIG. 2B, the pressing member 30 is moved to aside opposite to the distal end boss section, thereby being capable of cancelling the pressing force applied from the chuck claw member 22 to the radially outer surface Wa of the workpiece W. When the pressing member 30 is further lowered from the state illustrated in FIG. 2A, the leaf spring member 21 is tilted radially outward so that the chuck claw member 22 is moved away from the radially outer surface Wa of the workpiece W.

Next, description is made of a method of chucking the annular workpiece W through use of the chuck structure configured as described above. First, the ring body 33 is lowered with respect to the first vertically-movable shaft 1. That is, the second vertically-movable shaft 2 is lowered with respect to the first vertically-movable shaft 1. At this time, the pressing members 30 are held in contact with the leaf spring members 21, respectively, and a diameter of an arc, which is formed by an inner surface of each of the plurality of chuck claw members 22, is set to be larger than a diameter of the radially outer surface Wa of the workpiece W. In this manner, a clearance is defined between the frictional resistance increasing portions 22a of the plurality of chuck claw members 22 and the radially outer surface Wa of the workpiece W. Thus, the workpiece W is easily arranged within the plurality of chuck claw members 22.

Figure 3:
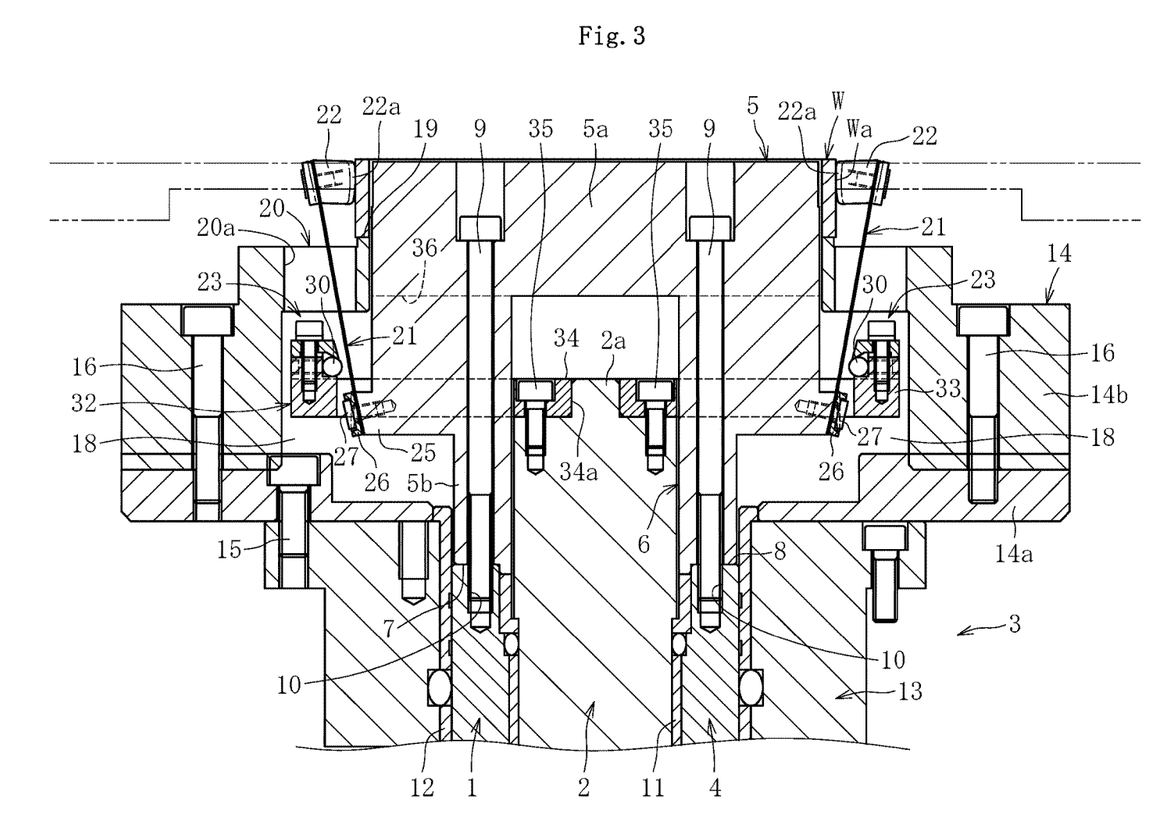
FIG. 3 is a sectional view for illustrating a state after the workpiece is arranged (before the workpiece is chucked).
Figure 4:
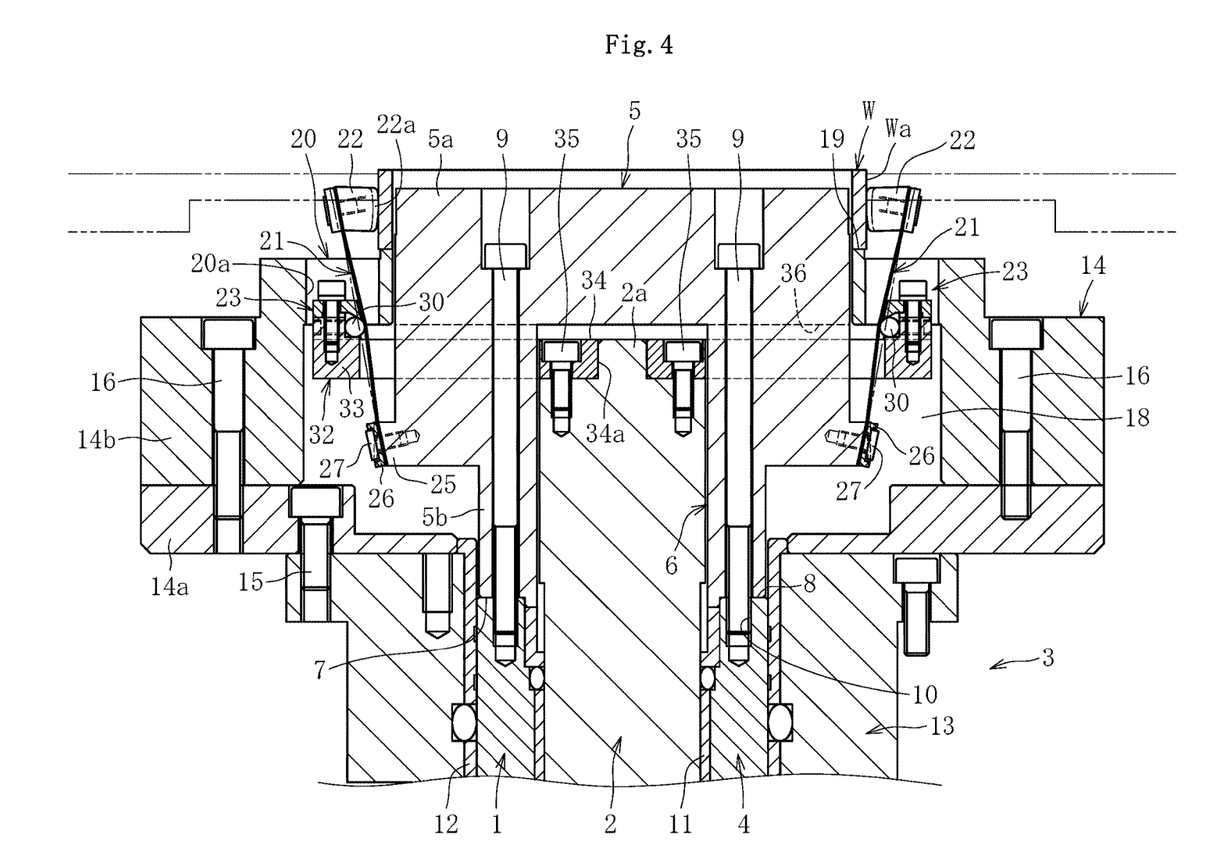
FIG. 4 is a sectional view for illustrating a state in which only a second vertically-movable shaft is raised from the state illustrated in FIG. 3.
Figure 5:
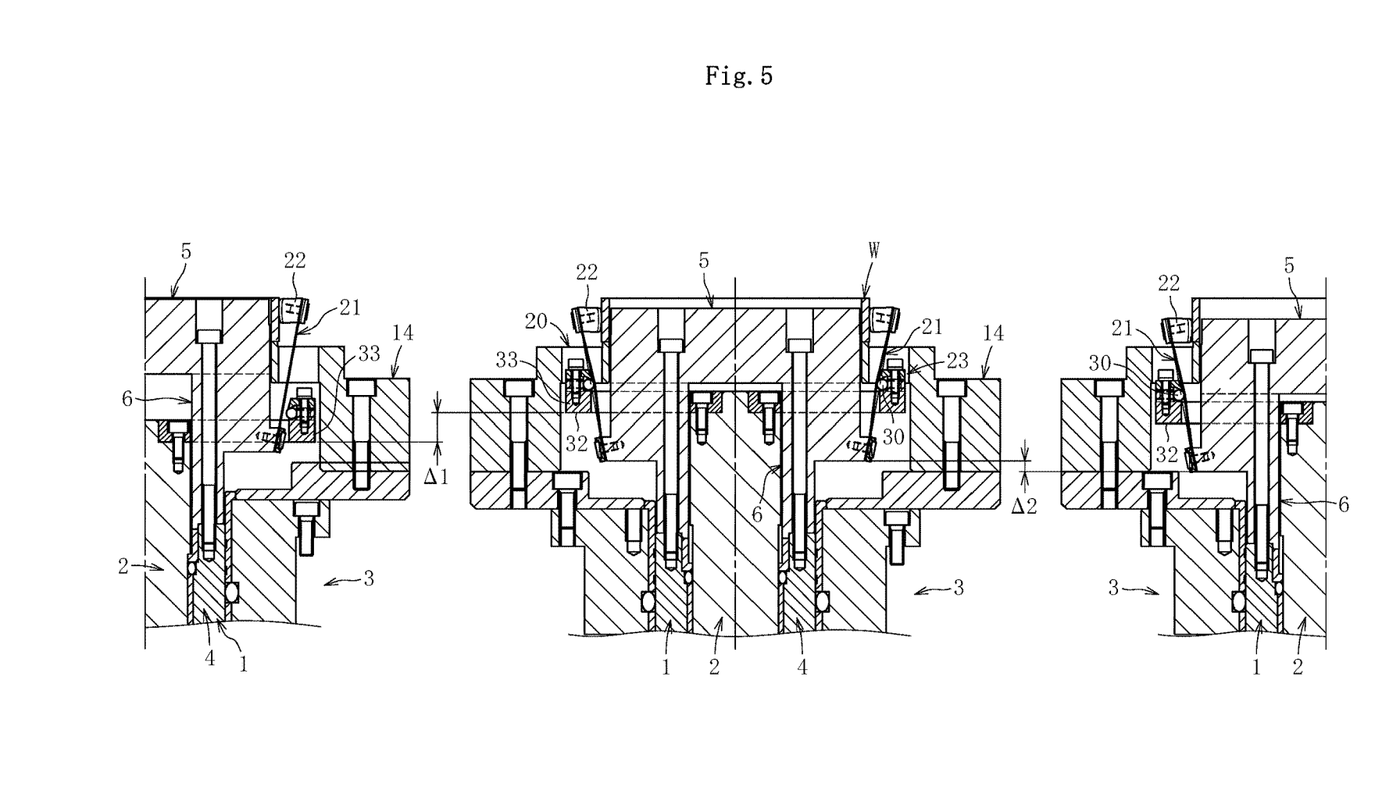
FIG. 5 is a sectional view for illustrating a relationship among the state illustrated in FIG. 1, the state illustrated in FIG. 3, and the state illustrated in FIG. 4.

In this state, as illustrated in FIG. 3, the shaft 1 being the first vertically-movable shaft is raised with respect to the rotary spindle 3 while the shaft 2 being the second vertically-movable shaft is lowered. In this state, the workpiece W is arranged within the chuck claw members 22 and on the backing plate 19. After that, the second vertically-movable shaft 2 is raised with respect to the first vertically-movable shaft 1, and the ring body 33 is raised with respect to the first vertically-movable shaft 1 by an amount of Δ1 (see FIG. 5).

Thus, as illustrated in FIG. 2B, the leaf spring members 21 can be pressed by the pressing members 30 to the radially inner side, that is, to the distal end boss section 5 side of the first vertically-movable shaft 1, and the chuck claw members 22 can apply the pressing force to the radially outer surface Wa of the workpiece W. In this way, the workpiece W is chucked by the chuck structure. That is, the workpiece W is brought into the state illustrated in FIG. 4. After that, under a state in which the workpiece W remains chucked, the first vertically-movable shaft 1 and the second vertically-movable shaft 2 are lowered with respect to the rotary spindle 3 by an amount of Δ2 (see FIG. 5). Thus, as illustrated in FIG. 1, the workpiece W can be reliably seated on the backing plate 19. There is a fear in that the workpiece W is inclined with respect to the backing plate 19 depending on an arrangement way of the workpiece.

Further, when the ring body 33 is lowered with respect to the first vertically-movable shaft 1 by the amount of Δ1 from the state illustrated in FIG. 1 to lower the pressing members 30 with respect to the first vertically-movable shaft 1, the pressing of the workpiece W by the chuck claw members 22 can be cancelled. Further, when the first vertically-movable shaft 1 and the second vertically-movable shaft 2 are raised by the amount of Δ2 afterward, the chuck structure can be returned to the state illustrated in FIG. 3.

According to the chuck structure of the present invention, a chucking force of elastically pressing the chuck claw members 22 onto the radially outer surface Wa of the workpiece W can be applied through the pressing force applying mechanism 23. Thus, the workpiece W can be chucked from the radially outer surface Wa side. In addition, the chuck claw members 22 are arranged at a predetermined pitch along the circumferential direction so as to be symmetrical with respect to the mechanism center axis. Accordingly, even when each of the chuck claw members 22 exerts a small pressing force on the radially outer surface Wa of the workpiece W, the chuck structure can stably chuck the workpiece W. Thus, even when the workpiece W is thin and annular, the chuck structure can stably chuck the workpiece W without deforming the workpiece W.

As each of the leaf spring members 21, there is used a leaf spring member arranged in an oblique posture so that a distal end side of the leaf spring member is directed radially outward. With this configuration, a moving amount of each chuck claw member 22 during a shift from a chucked state to an unchucked state or during a shifted from the unchucked state to the chucked state can be stably secured. In addition, a relatively large moving amount is secured as the moving amount of the chuck claw member 22. Accordingly, even when a circularity of the radially outer surface Wa of the workpiece W is somewhat poor, there is less influence on deformation, and accuracy of loading is not required.

The pressing members 30 can be moved up and down in synchronization with each other. Accordingly, the chuck claw members 22 are tightened and loosened in a radial direction in synchronization with each other, thereby being capable of chucking the workpiece with high accuracy. When the first vertically-movable shaft 1 and the second vertically-movable shaft 2 can be vertically moved independent of each other, the leaf spring members 21 and the pressing members 30 can be moved up and down at the same time by the same amount, or the leaf spring members 21 and the pressing members 30 can be moved up and down separately by the same amount or different amounts. Thus, the chucking force can be freely changed by freely varying a shifting amount of the leaf spring members.

The workpiece W can be stably seated on the backing plate 19. Thus, working on the workpiece through use of a machine tool such as a grinding machine employing the chuck structure can be performed with high accuracy.

Further, the pressing members 30 are held in contact with the leaf spring members 21 even when the workpiece is unchucked. With this configuration, the leaf spring members 21 and the chuck claw members 22 can be prevented from behaving unstably due to, for example, working fluid or a centrifugal force generated by rotation of the rotary spindle. A surface of each chuck claw member 22 to be brought into contact with the workpiece is formed as the frictional resistance increasing portion 22a. Thus, the chuck claw members 22 can exert more stable chucking force.

Still further, when the second vertically-movable shaft 2 is raised to raise the pressing members 30 under the state in which the workpiece is chucked as illustrated in FIG. 1, the force of pressing the workpiece W by the chuck claw members 22 can be increased. Further, when the second vertically-movable shaft 2 is lowered to lower the pressing members 30 under the state in which the workpiece is chucked as illustrated in FIG. 1, the pressing force of the chuck claw members 22 with respect to the workpiece W can be reduced. Accordingly, during working and the like, the chucking force applied to the workpiece W can be changed in accordance with working efficiency.

The embodiment of the present invention is described above. However, the present invention is not limited to the above-mentioned embodiment, and various modifications may be made thereto. As the leaf spring members 21 each comprising the chuck claw member 22, six leaf spring members are used in the above-mentioned embodiment. However, the number of the leaf spring members may be increased or reduced as appropriate. It is only necessary that at least three leaf spring members be arranged at a 120-degree pitch along the circumferential direction. Further, a length dimension, a width dimension, and a thickness dimension of each leaf spring member 21, an inclination angle of the leaf spring member in a free state, and the like can be set as appropriate as long as the leaf spring member 21 can be pressed by the pressing member 30 and can be tightened and loosened by up-and-down movement of the pressing member 30 and as long as the chuck claw member 22 can press the radially outer surface Wa of the workpiece W.

In the above-mentioned embodiment, the chuck structure chucks the annular workpiece from the radially outer side of the workpiece. However, the chuck structure may chuck the annular workpiece from a radially inner side of the workpiece. In this case, the chuck structure may comprise leaf spring members arranged at a predetermined pitch along a circumferential direction of the chuck structure so as to be symmetrical with respect to a mechanism center axis, chuck claw members mounted to distal ends of the leaf spring members, respectively, and a pressing force applying mechanism configured to apply a force of pressing the leaf spring members radially outward, to thereby elastically press the chuck claw members onto a radially inner surface of the workpiece.

In the chuck structure configured to chuck the annular workpiece from the radially inner side of the workpiece, a chucking force of elastically pressing the chuck claw members onto the radially inner surface of the workpiece can be applied through the pressing force applying mechanism. Thus, the workpiece can be chucked from the radially inner surface side of the workpiece. In addition, the chuck claw members are arranged at a predetermined pitch along the circumferential direction so as to be symmetrical with respect to the mechanism center axis. Accordingly, even when each of the chuck claw members exerts a small pressing force on the radially inner surface of the workpiece, the chuck structure can stably chuck the workpiece. Thus, even when the workpiece is thin and annular, the chuck structure can stably chuck the workpiece without deforming the workpiece.

That is, the chuck structure according to the invention of the subject application comprises leaf spring members arranged at a predetermined pitch along a circumferential direction of the chuck structure so as to be symmetrical with respect to a mechanism center axis, chuck claw members mounted to distal ends of the leaf spring members, respectively, and a pressing force applying mechanism configured to apply a force of pressing the leaf spring members, to thereby elastically press the chuck claw members onto the workpiece. The pressing force applying mechanism applies the force of pressing the leaf spring members radially inward or radially outward, to thereby elastically press the chuck claw members onto a radially outer surface or a radially inner surface of the workpiece.

INDUSTRIAL APPLICABILITY

Further, as each of the pressing members 30, in addition to the round bar, a member having another shape such as a spherical shape may be used. The chuck structure according to the present invention may be used not only for a grinding machine but also for various machine tools such as a lathe, a drilling machine, and a milling machine.

REFERENCE SIGNS LIST 1 vertically-movable shaft
2 vertically-movable shaft
19 backing plate
21 leaf spring member
22 chuck claw member
23 pressing force applying mechanism
30 pressing member
W workpiece
Wa radially outer surface

The invention claimed is:

1. A chuck structure, which is configured to chuck an annular workpiece from a radially outer side of the workpiece, the chuck structure comprising:
    leaf spring members arranged at a predetermined pitch along a circumferential direction of the chuck structure so as to be symmetrical with respect to a mechanism center axis;
    chuck claw members mounted to distal ends of the leaf spring members, respectively; and
    a pressing force applying mechanism configured to apply a force of pressing the leaf spring members radially inward, to thereby elastically press the chuck claw members onto a radially outer surface of the workpiece,
    wherein each of the leaf spring members is arranged in an oblique posture so that a distal end side of each of the leaf spring members is directed radially outward,
    wherein the pressing force applying mechanism comprises a pressing member to be brought into contact with a radially outer side of each of the leaf spring members, and
    wherein the chuck claw members are tightened and loosened by up-and-down movement of the pressing member.

2. The chuck structure according to claim 1,
    wherein the pressing member comprises a plurality of pressing members arranged to correspond to the leaf spring members, respectively, and
    wherein the plurality of pressing members are moved up and down in synchronization with each other.

3. The chuck structure according to claim 1, further comprising:
    a first vertically-movable shaft configured to hold the leaf spring members;
    a second vertically-movable shaft configured to hold the pressing member; and
    a vertically moving mechanism configured to vertically move the first vertically-movable shaft and the second vertically-movable shaft independently of each other.

4. The chuck structure according to claim 3, further comprising a backing plate that forms a positioning reference surface for the workpiece,
    wherein, under a state in which the leaf spring members chuck the workpiece, simultaneous and relative movement of the first vertically-movable shaft and the second vertically-movable shaft with respect to the backing plate enables a lower end surface of the workpiece to be pressed onto the backing plate.

5. The chuck structure according to claim 1, which is used to chuck the workpiece on a rotary spindle of a machine tool.

6. The chuck structure according to claim 5, wherein the machine tool comprises a grinding machine.

7. A chuck structure, which is configured to chuck an annular workpiece from a radially inner side of the workpiece, the chuck structure comprising:
    leaf spring members arranged at a predetermined pitch along a circumferential direction of the chuck structure so as to be symmetrical with respect to a mechanism center axis;
    chuck claw members mounted to distal ends of the leaf spring members, respectively; and
    a pressing force applying mechanism configured to apply a force of pressing the leaf spring members radially outward, to thereby elastically press the chuck claw members onto a radially inner surface of the workpiece,
    wherein each of the leaf spring members is arranged in an oblique posture so that a distal end side of each of the leaf spring members is directed radially inward,
    wherein the pressing force applying mechanism comprises a pressing member to be brought into contact with a radially inner side of each of the leaf spring members, and
    wherein the chuck claw members are tightened and loosened by up-and-down movement of the pressing member.

* * * * *